| United States Patent [19] | [11] Patent Number: 4,804,767 |
| --- | --- |
| Käser | [45] Date of Patent: Feb. 14, 1989 |

[54] PROCESS FOR THE PREPARATION OF DISPERSE DYES

[75] Inventor: Adolf Käser, Bottmingen, Switzerland

[73] Assignee: Ciba-Geigy Corporation, Ardsley, N.Y.

[21] Appl. No.: 79,053

[22] Filed: Jul. 29, 1987

[30] Foreign Application Priority Data

Aug. 8, 1986 [CH] Switzerland .......................... 3199/86

[51] Int. Cl.[4] .................. C07C 103/75; C07D 333/32; C07D 307/02
[52] U.S. Cl. ...................................... 549/65; 260/377; 260/691; 549/475; 549/479
[58] Field of Search ..................... 260/377, 691; 560/1, 560/5; 558/278, 273; 549/65, 475, 479

[56] References Cited

U.S. PATENT DOCUMENTS

3,803,168  4/1974  Kolliker et al. ...................... 260/377
3,806,524  4/1974  Kolliker et al. ...................... 260/377

OTHER PUBLICATIONS

Morrison & Boyd, *Organic Chemistry* 3rd ed. 1973, p. 666.

*Primary Examiner*—Richard L. Raymond
*Assistant Examiner*—Raymond Covington
*Attorney, Agent, or Firm*—Kevin T. Mansfield; Edward McC. Roberts

[57] ABSTRACT

Dyes of formula (1) as claimed in claim 1 can conveniently be prepared by reacting an anthraquinone compound of formula (2) with a haloformate of formula (3) in an inert organic solvent and in the presence of 1 to 2 moles of a heterocyclic tertiary nitrogen base per mole of compound of formula (2).

22 Claims, No Drawings

PROCESS FOR THE PREPARATION OF DISPERSE DYES

The present invention relates to a process for the preparation of disperse dyes.

Disperse dyes of formula (1) below are known from DE-A No. 20 15 587. These dyes are obtained by dissolving 1-amino-2-hydroxyalkoxy-4-hydroxyanthraquinone in pyridine and carrying out subsequent reaction with a chloroformate. Methanol is then added to precipitate the dye, which is isolated by filtration.

This method has a number of drawbacks. As the reaction mixture has a propensity to gel in pyridine, it is necessary to add large amounts of pyridine to prevent such gelation, with the consequence that poor space/time yields are obtained. In addition, the crystal form is not entirely satisfactory, so that heat formation of the crystals is necessary, which in turn gives rise to the danger of transesterification. In addition, regeneration of the solvent is complicated.

It is the object of the present invention to provide an improved process for obtaining the said dyes. This object is achieved by carrying out the process in an inert solvent. The dyes are obtained in the desired crystal form and, furthermore, in many cases in higher yield. In addition, concentrated solutions may be used and regeneration of the solvent is simpler.

Accordingly, the present invention relates to a process for the preparation of disperse dyes of formula

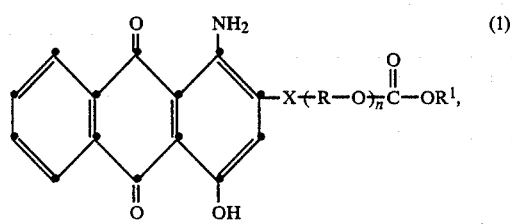

wherein
X is —O— or —S—,
R is $C_2$–$C_6$alkylene,
$R^1$ is an unsubstituted or substituted aliphatic, cycloaliphatic or aromatic radical, and
n is an integer from 1 to 3,
by reacting a compound of formula

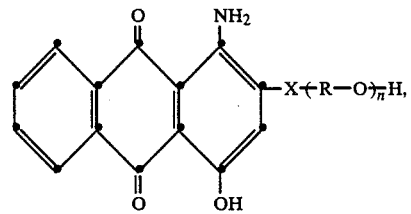

wherein X, R and n are as defined above, with a haloformate of formula

wherein Hal is chlorine or bromine and $R^1$ has the given meaning, which process comprises carrying out the reaction in an inert organic solvent and in the presence of 1 to 2 moles of a heterocyclic tertiary nitrogen base per mole of compound of formula (2).

In the above formulae X is preferably —O—.

R is an unbranched or branched alkylene radical of 2 to 6 carbon atoms which may be substituted, e.g. by hydroxy. Examples of suitable radicals R are: ethylene, 1,2- or 1,3-propylene, 1,6-hexylene, 1-methyl-1,3-propylene, 2-methyl-1,3-propylene, 3-methyl-1,3-propylene, 2,2-dimethyl-1,3-propylene and 2-hydroxy-1,3-propylene. Preferably R is ethylene, 1,3-propylene or 2-hydroxy-1,3-propylene. n is an integer from 1 to 3 and is preferably 1 or 2.

$R^1$ as an aliphatic radical may be a straight chain or branched chain unsubstituted or substituted alkyl or alkenyl group (in the latter case preferably a $\Delta^2$alkenyl group) of preferably 1 to 8 carbon atoms.

Possible substituents of these aliphatic radicals are e.g. halogen atoms such as chlorine or bromine, a lower alkoxy group, an aryloxy group such as phenoxy, as well as a carbocyclic ring, preferably of aromatic character, e.g. the phenyl radical, or a heterocyclic ring such as the 2-thienyl, 2-furyl or 2-tetrahydrofuryl radical.

$R^1$ as a cycloaliphatic radical may be a cycloalkyl group containing preferably a 5- or 6-membered ring and is preferably the cyclohexyl or methylcyclohexyl group.

$R^1$ as an aromatic radical is preferably a radical of the benzene series and may contain customary nonionic substituents. Examples of such substituents are: halogen such as fluorine, chlorine or bromine, or lower alkyl groups such as the methyl group.

Examples of suitable radicals $R^1$ are: methyl, ethyl, n-propyl or isopropyl, n-butyl, isobutyl or tert-butyl, amyl, alkyl, chloromethyl, bromoethyl, methoxyethyl, phenoxyethyl, benzyl, cyclohexyl, methylcyclohexyl, phenyl, chlorophenyl, methylphenyl or dimethylphenyl. Particularly preferred radicals $R^1$ are methyl, ethyl and phenyl.

The compounds of formulae (2) and (3) are known or can be prepared by conventional methods.

The reaction of the anthraquinone compound of formula (2) with the haloformate is carried out in an inert solvent in the termperature range from about 10° to 150° C., preferably from 40° to 100° C. The optimum temperature depends e.g. on the solubility of the educts and can be readily ascertained.

Examples of inert organic solvents are aromatic hydrocarbons or halogenated or nitrated aromatic hydrocarbons such as toluene, xylenes, chlorobenzene, dichlorobenzene, nitrobenzene, as well as aliphatic hydrocarbons or aliphatic halogenated hydrocarbons such as chloroform, carbon tetrachloride, dichloroethane or tetrachloroethane, and also aliphatic ketones. Preferred solvents are toluene and xylene.

The anthraquinone compound of formula (2) and the haloformate of formula (3) can be used in stoichiometric amounts. However, in general it is desirable to use an excess of the ester, e.g. an excess of 5 to 100 mole %, preferably 10 to 75 mole %, based on the anthraquinone compound.

The reaction takes place in the presence of 1 to 2 moles, preferably 1 to 1.6 moles, of a heterocyclic tertiary nitrogen base per mole of anthraquinone compound of formula (2).

Examples of suitable tertiary nitrogen bases are: pyridine, 2-, 3-or 4-methylpyridine, 2-, 3- or 4-ethylpyridine, 2,3-, 2,4-, 2,5-, 2,6-. 3,4- or 3,5-dimethylpyridine, 5-ethyl-2-methylpyridine, quinoline or 4-methylquinoline.

Preferred bases are 3-methylpyridine, 4-methylpyridine and, in particular, pyridine.

Upon completion of the reaction, the resultant dyes can be worked up in conventional manner, e.g. by evaporating the reaction mixture to dryness and deionising the residue in the customary manner.

However, upon completion of the reaction it is preferred to cool the reaction mixture, e.g. to room temperature, and then to add 1 to 2 moles of water and 1 to 2 moles of an organic base per mole of anthraquinone compound of formula (2).

The solvent and the heterocyclic tertiary nitrogen base are subsequently removed, e.g. by filtration or distillation, and the dye is deionised, if desired. By means of this procedure it is especially easy to recover the solvent and the nitrogen base for reuse.

Examples of suitable inorganic bases are hydroxides, carbonates or phosphates of alkali metals or alkaline earth metals, e.g. sodium or potassium carbonate or sodium or potassium bicarbonate, sodium hydroxide, potassium hydroxide or barium hydroxide, disodium hydrogen phosphate or sodium phosphate. It is preferred to use sodium hydroxide, sodium carbonate or sodium bicarbonate or disodium hydrogen phosphate.

With respect to their dyeing properties, the dyes prepared by the process of this invention correspond to the dyes obtained by the known process in pyridine, and they are especially suitable for dyeing polyester textiles in orange to red shades.

The invention is illustrated by the following Examples, in which parts and percentages are by weight.

EXAMPLE 1

67.3 g of 1-amino-2-(2'-hydroxyethoxy)-4-hydroxyanthraquinone are suspended in 220 g of toluene and 23.1 g of pyridine. With efficient stirring, 42.3 g of phenyl chloroformate are added dropwise at 70°–75° C. over 2 hours. When the dropwise addition is complete, the reaction mixture is stirred for 15 minutes at 70° C. The reaction mixture is then cooled to 20° C., stirred for 15 minutes after addition of 7.2 g of water and then for 1 hour after addition of 47.9 g of anhydrous $Na_2HPO_4$. The batch is then cooled to 10° C., filtered with suction, and the filter cake is washed with 45 g of toluene. The moist toluene-containing filter cake is subjected to steam distillation, filtered with suction and dried, affording 82.5 g of a red dye which dyes polyester fabric in the same manner as a sample prepared in pyridine.

EXAMPLE 2

67.3 g of 1-amino-2-(2'-hydroxyethoxy)-4-hydroxyanthraquinone are suspended in 220 g of xylene and 42.7 g of ethyl chloroformate. With efficient stirring, 27.0 g of pyridine are added dropwise at 65°–70° C. over 2 hours and the reaction mixture is stirred for 15 minutes at 70° C. and then cooled to 20° C. After addition of 7.2 g of water stirring is continued for 15 minutes and subsequently for 1 hour after addition of 21.5 g of $Na_2CO_3$. The batch is cooled to 10° C., filtered with suction, and the filter cake is washed with 45 g of a mixture of xylenes, then freed from solvent at 80° C. under vacuum. For deionisation, the crude dye is stirred for 30 minutes at 60° C. in 500 ml of water (pH 6–9), filtered, and washed with water until free from salt. Yield: 107.0 g of moist dye with solids content of 66.1%.

EXAMPLE 3

202 g of 1-amino-2-(2'-hydroxyethoxy)-4-hydroxyanthraquinone are charged to 660 g of toluene and 70.2 g of pyridine. Then 65.6 g of ethyl chloroformate are added at 70° C. over 1 hour, followed by the addition of 58.2 g of phenyl chloroformate over 1 hour. The reaction mixture is stirred for 15 minutes at 70° C. and then cooled to 20° C. Stirring is continued after addition of 20 g of water and then of 82.0 g of $NaHCO_3$. After the evolution of $CO_2$ has subsided, the solvent is distilled off by cautious heating, initially at normal pressure and later under weak vacuum, to give 348.6 g of a salt-containing dye which is deionised as described in Example 2. Yield: 441.7 g of a moist dye with a solids content of 59.0%, which dyes polyester fabric in red shades.

EXAMPLE 4

The procedure of Example 1 is repeated, replacing 1-amino-2-(2'-hydroxyethoxy)-4-hydroxyanthraquinone by an equivalent amount of 1-amino-2-(2'-hydroxyethylthio)-4-hydroxyanthraquinone. The dye so obtained is the same as that obtained in Example 1 and dyes polyester material in violet shades.

What is claimed is:

1. In a process for the preparation of a disperse dye of formula

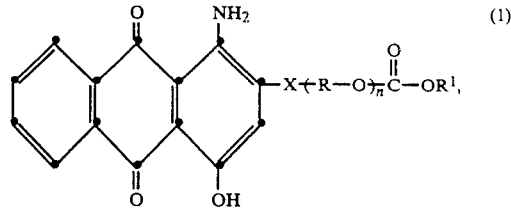

wherein
 X is —O— or —S—,
 R is $C_2$-$C_6$alkylene which is unsubstituted or substituted by hydroxy,
 $R^1$ is $C_1$-$C_8$-alkyl which is unsubstituted or substituted by halogen, $C_1$-$C_4$-alkoxy, phenoxy, phenyl, 2-thienyl, 2-furyl or 2-tetrahydrofuryl, or is $C_5$ or $C_6$-cycloalkyl which is unsubstituted or substituted by $C_1$-$C_4$-alkyl, or is phenyl which is unsubstituted or substituted by halogen or $C_1$-$C_4$-alkyl and
 n is an integer from 1 to 3,
by reacting a compound of formula

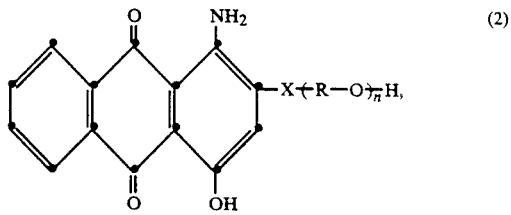

wherein X, R and n are as defined above, with a haloformate of formula

wherein Hal is chlorine or bromine and $R^1$ has the given meaning, the improvement consisting of carrying out the reaction in an inert organic solvent and in the presence of 1 to 2 moles of a heterocyclic tertiary nitrogen base per mole of compound of formula (2).

2. A process according to claim 1 for the preparation of a dye of formula (1), wherein X is —O—.

3. A process according to claim 2 for the preparation of a dye of formula (1), wherein R is an unbranched or branched alkylene radical of 2 to 6 carbon atoms which is unsubstituted or substituted by hydroxy.

4. A process according to claim 3, wherein R is ethylene, 1,3-propylene or 2-hydroxy-1,3-propylene.

5. A process according to claim 1 for the preparation of a dye of formula (1), wherein n is 1 or 2.

6. A process according to claim 1 for the preparation of a dye of formula (1), wherein $R^1$ is $C_1$–$C_8$-alkyl which is unsubstituted or substituted by halogen, $C_1$–$C_4$-alkoxy, phenoxy, phenyl, 2-thienyl, 2-furyl or 2-tetrahydrofuryl, or is $C_5$ or $C_6$-cycloalkyl which is unsubstituted or substituted by $C_1$–$C_4$-alkyl, or is phenyl which is unsubstituted or substituted by halogen or $C_1$–$C_4$-alkyl.

7. A process according to claim 6, wherein $R^1$ is methyl, ethyl, n-propyl or isopropyl, n-butyl, isobutyl or tert-butyl, amyl, alkyl, chloromethyl, bromoethyl, methoxyethyl, ethoxyethyl, phenoxyethyl, benzyl, cyclohexyl, methylcyclohexyl, phenyl, chlorophenyl, methylphenyl or dimethylphenyl.

8. A process according to claim 7, wherein $R^1$ is methyl, ethyl or phenyl.

9. A process according to claim 1 for the preparation of a dye of formula (1), wherein X is —O—, R is an unbranched or branched alkylene radical of 2 to 6 carbon atoms which is unsubstituted or substituted by hydroxy and $R^1$ is $C_1$–$C_8$-alkyl which is unsubstituted or substituted by halogen, $C_1$–$C_4$-alkoxy, phenoxy, phenyl, 2-thienyl, 2-furyl or 2-tetrahydrofuryl, or is $C_5$ or $C_6$-cycloalkyl which is unsubstituted or substituted by $C_1$–$C_4$-alkyl, or is phenyl which is unsubstituted or substituted by halogen or $C_1$–$C_4$-alkyl.

10. A process according to claim 9, wherein X is —O—, R is ethylene, 1,3-propylene or 2-hydroxy-1,3-propylene, n is 1 or 2, and $R^1$ is methyl, ethyl or phenyl.

11. A process according to claim 1, wherein the reaction is carried out in the temperature range from 0° to 150° C.

12. A process according to claim 1, wherein the inert solvent is an aromatic hydrocarbon or a halogenated or nitrated aromatic hydrocarbon, an aliphatic hydrocarbon or a halogenated aliphatic hydrocarbon or an aliphatic ketone.

13. A process according to claim 12, wherein the inert solvent is toluene or xylene.

14. A process according to claim 1, wherein the ester of formula (3) is used in an excess of 5 to 100 mole % based on the anthraquinone compound of formula (2).

15. A process according to claim 1, wherein the heterocyclic tertiary nitrogen base is pyridine, 2-, 3- or 4-methylpyridine, 2-, 3- or 4-ethylpyridine, 2,3-, 2,4-, 2,5-, 2,6-, 3,4- or 3,5-dimethylpyridine, 5-ethyl-2-methylpyridine, quinoline or 4-methylquinoline.

16. A process according to claim 15, wherein the heterocyclic tertiary nitrogen base is 3- or 4-methylpyridine or pyridine.

17. A process according to claim 1, wherein 1 to 1.6 moles of heterocyclic tertiary nitrogen base are used per mole of anthraquinone compound of formula (2).

18. A process according to claim 1, wherein the reaction mixture is cooled upon completion of the reaction, 1 to 2 moles of water and 1 to 2 moles of an inorganic base are added per mole or anthraquinone compound of formula (2), and the solvent is then removed.

19. A process according to claim 18, wherein the inorganic base is sodium hydroxide, sodium carbonate or disodium hydrogen phosphate.

20. A process according to claim 1, wherein the reaction is carried out in the temperature range from 40° to 100° C.

21. A process according to claim 1, wherein the ester of formula (3) is used in an excess of 10 to 70 mole %, based on the anthraquinone compound of formula (2).

22. A process according to claim 15, wherein the heterocyclic tertiary nitrogen base is pyridine.

* * * * *